May 12, 1931. R. B. WOLF ET AL 1,804,967
PROCESS OF PRODUCING CELLULOSE FROM LIGNIFIED MATERIAL
Filed June 13, 1930
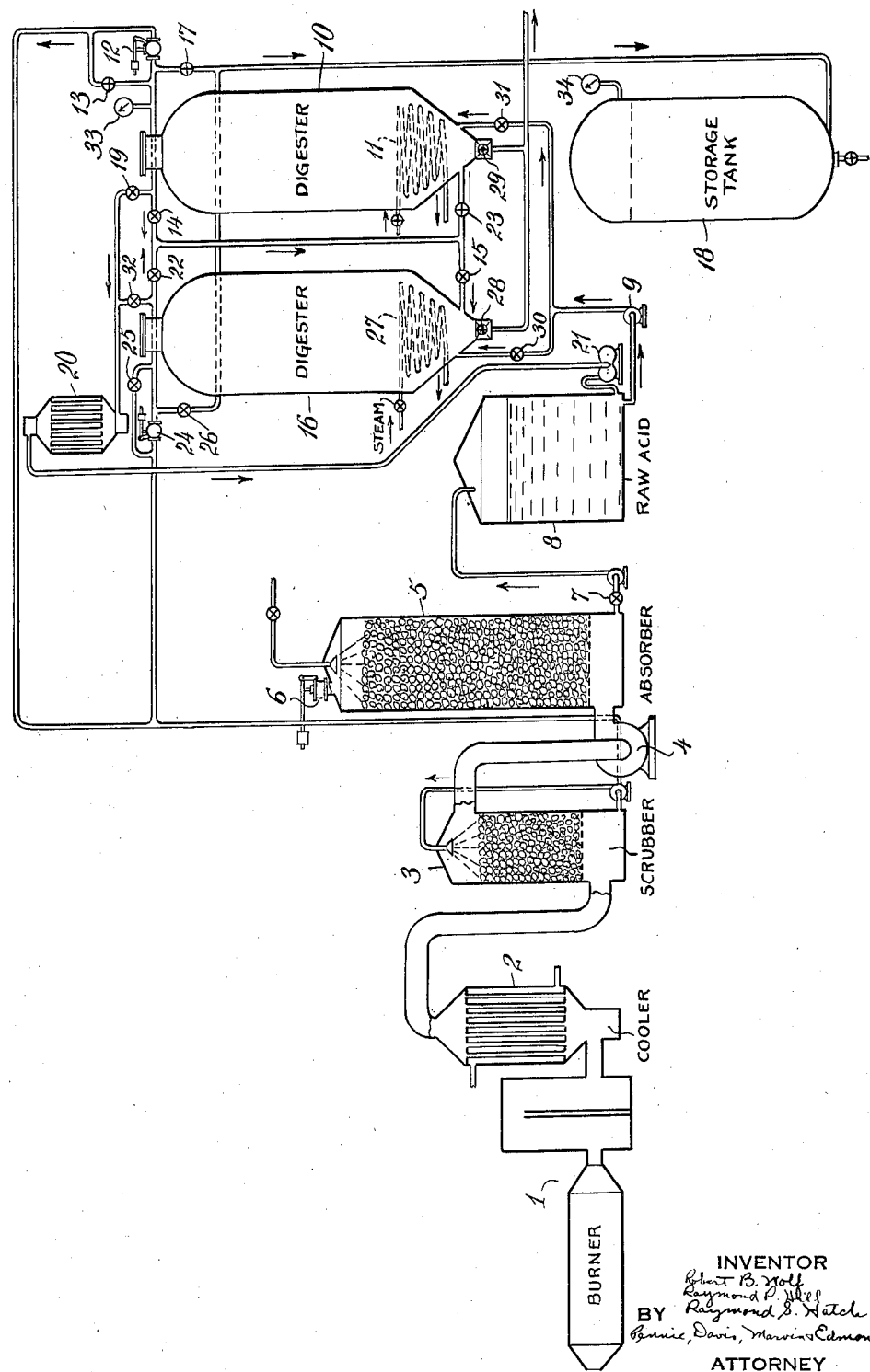
INVENTOR
Robert B. Wolf
Raymond S. Hatch
BY
Pennie, Davis, Marvin & Edmonds
ATTORNEY Patented May 12, 1931

1,804,967

UNITED STATES PATENT OFFICE

ROBERT B. WOLF, OF NEW YORK, N. Y., AND RAYMOND P. HILL, OF GLEN ROCK, AND RAYMOND S. HATCH, OF EAST ORANGE, NEW JERSEY, ASSIGNORS TO LIGNO-CELLULOSE CORPORATION, OF NEW YORK, N. Y., A CORPORATION OF DELAWARE

PROCESS OF PRODUCING CELLULOSE FROM LIGNIFIED MATERIAL

Application filed June 13, 1930. Serial No. 460,976.

This invention relates to the production of cellulose and particularly to an improved method of treating lignified vegetable material such as wood, jute, flax, straw and the like to produce a larger yield of high quality cellulose fibres.

In 1867, Benjamin C. Tilghman was granted United States Patent No. 70,483 for the production of cellulose from wood and other ligneous material, by heating the wood under pressure with a solution of sulphur dioxide. Early in his experiments with solutions of sulphur dioxide, Tilghman found that the pulp produced was brown in color and not bleachable. This brown color was, he assumed, caused by the presence of free sulphuric acid and this led him to add a certain amount of such bases as calcium or magnesium hydroxide to the sulphurous acid solutions, to overcome the harmful effect of the sulphuric acid present. As a result of Tilghman's experience, definite amounts of bases, such as calcium or magnesium in combination with more or less sulphurous acid have been used in the practice of the so-called sulphite process.

The object of this invention is to provide an improved and simplified procedure for the recovery of cellulose from available cellulose-containing materials.

A further object of the invention is to effect a material saving in sulphur and steam, as compared with the sulphur and steam consumed in producing cellulose by the well known bisulphite process.

Another object of the invention is to provide for the convenient recovery of the excess of sulphur dioxide used in the process and to render the recovered gas immediately available for further operation of the process.

Another object of the invention is to produce a sulphonated lignin compound, free from inorganic bases and polymerized to a minimum extent, which will serve as a raw material for the production of valuable organic by-products.

In studying the effect of strong solutions of free sulphur dioxide, we have discovered that if concentrations exceeding 12% free $SO_2$ are used we obtain extremely rapid penetration of the wood substance, and that cooking can be carried on at temperatures much lower than those used at present, rarely exceeding 100° C. We have further discovered that with concentrations of $SO_2$ in excess of 12%, no base is necessary and with the proper recovery methods the sulphur consumption is much less than in the case of the sulphite process as now carried on.

We have discovered, however, that when working with solutions of sulphur dioxide of 12% concentration, or greater, the technology of the acid preparation and gas recovery demands methods and equipment quite different from those in use in the well known bi-sulphite process, and the various steps in the cooking of the raw material and recovery of the gas must be carried out in a manner entirely unique.

We have also discovered that at pressures of approximately two or three atmospheres both sulphur dioxide gas and liquid are miscible with water, in all proportions, at temperatures normally encountered in the recovery process. In order, therefore, to easily and economically recover the bulk of the excess gas left in the digester after the cooking process, it is only necessary to relieve this gas into another vessel, containing water or a weak solution of $SO_2$ at a pressure of 40 to 50 pounds per square inch. The gas remaining in the digester when the pressure has been lowered to 40–50 pounds may then be removed, cooled, and absorbed in water or weak $SO_2$ solution, which will later serve as the solution in which subsequent large amounts of $SO_2$ may be absorbed at 40 to 50 pounds pressure.

It is important to avoid elevated temperatures in the process of removing the residual sulphur dioxide from the contents of the digester after the main portion of the gas has been recovered. For this reason we prefer to relieve down to atmospheric pressure and, subsequently, to reduce the pressure in the digester below atmospheric, by means of a vacuum pump, which will accomplish complete removal of the remaining sulphur dioxide without raising the temperature of the mixture of cellulose and sulphonated lignin remaining in the digester.

After removing all possible free sulphur dioxide, there remains in the digester a solution of sulphonated lignin and the cellulose present in the lignified raw material. This mixture is flushed out of the digester and the sulphonated lignin solution separated from the cellulose. The sulphonated lignin solution is available for the production of valuable by-products.

In order to provide strong sulphur dioxide solutions that will be available for charging digesters after a shut down of the plant, or to supply a compensating amount of strong sulphur dioxide to overcome moisture variations in the ligno-cellulose raw material, we prefer to prepare continuously a definite excess of sulphur dioxide over that necessary for actual combination with the lignin. During the relieving of the sulphur dioxide, after the cooking is completed, a definite amount of this excess gas is relieved into a storage vessel containing water and maintained at a pressure of from 45 to 55 pounds per square inch. Under these conditions the solution may be built up in sulphur dioxide content to any desired concentration, since at 55 pounds per square inch pressure and normal temperatures pure sulphur dioxide and water are miscible in all proportions.

In the accompanying drawing we have shown diagrammatically an apparatus adapted for carrying on the digesting of the raw material with strong solutions of free $SO_2$, and for the recovery of the unconsumed $SO_2$.

Referring to the drawing, a sulphur burner 1 with its combustion chamber is connected to a gas cooler 2. The gas is delivered to a scrubber 3 in which a soluble bi-sulphite is circulated to remove any $SO_3$ present by a double decomposition, liberating $SO_2$ to replace the $SO_3$. A blower 4 capable of raising the gas pressure to 20 to 25 pounds per square inch forces the gas into an absorbing tower 5, which is filled with inert material. Water flows down over this inert material and presents a large absorbing surface to the upward flowing gas. The pressure in the tower 5 is limited by a pressure regulating valve 6. Weak acid flows through a valve 7 into one of the series of storage tanks 8. The weak acid is pumped by means of pump 9 through valve 31 into a digester 10 containing the charge of raw material, wood chips, for example. The weak acid is brought up to proper strength by means of very strong acid from storage, or other suitable source, after which steam is admitted to the coils 11. The pressure in the digester 10 rises and air and weak gas are allowed to escape through the valve 13, to the tower 5. When the air has all been relieved from the digester 10, the valve 13 is closed and the contents of the digester are brought to the desired temperature and pressure, which pressure must exceed six atmospheres and is preferably in excess of fifteen atmospheres. The contents are kept at that point until the lignin has combined with all of the $SO_2$ it will take up. The steam is then shut off and valves 14 and 15 are opened, admitting $SO_2$ to the digester 16, which contains a charge of raw material and weak acid from the storage tank 8. At the same time the valve 17 is opened to allow a definite percentage of the gas from the digester 10 to pass to the storage tank 18. When the pressure in the digester 10 drops to about 55 pounds, the valve 17 is closed and relief into the digester 16 is continued until the pressure in the digester 10 is down to 35 to 40 pounds. The valves 14 and 15 are then closed, the valve 19 is opened, and the gas passes through the cooler 20 and pump 21 into the weak acid in the tank 8, until a slight vacuum is produced in the digester 10. Alternatively, if a pump capable of overcoming sufficient pressure is employed, the gas may be pumped through valve 17 into storage vessel 18. The valve 19 is then closed and the contents of the digester 10 are discharged through the valve 29. Steam is then admitted into the coil 27 in the digester 16. Air is relieved through the valve 25 after which the valve 25 is closed; valves 22 and 23 are opened and $SO_2$ is admitted into digester 10, which contains a fresh charge of raw material and weak acid from the tank 8. Valves 12 and 24 are safety valves set at any predetermined pressures. Valve 26 takes excess $SO_2$ to the storage tank 18. Valve 32 conducts gas, after the pressure is reduced to 35 to 40 pounds in the digester 16, back to the weak acid tank 8. The pressures are indicated by pressure gauges 33 and 34.

As will be understood readily from the foregoing description, the procedure permits the preparation and maintenance of very strong solutions of sulphur dioxide containing upward from 12% of free $SO_2$, and the use of such solutions in the digesters. It provides nevertheless for the recovery of the sulphur dioxide which is relieved at the lower pressures. The use of strong solutions of sulphur dioxide in the digester ensures the most effective cooking at relatively low temperatures, thus avoiding polymerization of the sulphonated lignin, and saving a considerable quantity of steam, indirect heating being employed preferably. It likewise avoids the necessity for the presence of bases in the cooking liquor which in turn permits the recovery of lignin constituents free from inorganic bases.

Various changes may be made in the details of procedure and apparatus employed without departing from the invention or sacrificing any of the advantages thereof.

We claim:

1. The method of recovering cellulose from cellulose-containing material which comprises digesting the material at a pressure exceeding six atmospheres with a water solution free from inorganic bases and containing more than 12% of free $SO_2$.

2. The method of recovering cellulose from cellulose-containing material which comprises digesting the material at a temperature below 100° C. and a pressure exceeding six atmospheres with a water solution free from inorganic bases and containing more than 12% of free $SO_2$.

3. The method of recovering cellulose from cellulose-containing material which comprises digesting the material with a water solution free from inorganic bases and containing more than 12% of free $SO_2$, and absorbing the relief gases at a pressure above 40 pounds per square inch in water under such pressure.

4. The method of recovering cellulose from cellulose-containing material which comprises digesting the material with a water solution free from inorganic bases and containing more than 12% of free $SO_2$, absorbing the relief gases at a pressure above 40 pounds per square inch in water under such pressure, and absorbing the balance of the relief gases at atmospheric pressure.

5. The method of recovering cellulose from cellulose-containing material which comprises digesting the material with a water solution free from inorganic bases and containing more than 12% of free $SO_2$, absorbing the relief gases at a pressure above 40 pounds per square inch in water under such pressure, absorbing the balance of the relief gases at atmospheric pressure, and finally subjecting the cooked material to sub-atmospheric pressure to remove any remaining free sulphur dioxide.

6. The method of recovering cellulose from cellulose-containing material which comprises digesting the material at a pressure exceeding six atmospheres with indirect heating in a water solution free from inorganic bases and containing more than 12% of free $SO_2$.

7. The method of recovering cellulose from cellulose-containing material which comprises digesting the material at a temperature below 100° C. and a pressure exceeding six atmospheres with indirect heating in a water solution free from inorganic bases and containing more than 12% of free $SO_2$.

8. The method of recovering cellulose from cellulose-containing material which comprises digesting the material with indirect heating in a water solution free from inorganic bases and containing more than 12% of free $SO_2$, and absorbing the relief gases at a pressure above 40 pounds per square inch in water under such pressure.

9. The method of recovering cellulose from cellulose-containing material which comprises digesting the material with indirect heating in a water solution free from inorganic bases and containing more than 12% of free $SO_2$, absorbing the relief gases at a pressure above 40 pounds per square inch in water under such pressure, and absorbing the balance of the relief gases at atmospheric pressure.

10. The method of recovering cellulose from cellulose-containing material which comprises digesting the material with indirect heating in a water solution free from inorganic bases and containing more than 12% of free $SO_2$, absorbing the relief gases at a pressure above 40 pounds per square inch in water under such pressure, absorbing the balance of the relief gases at atmospheric pressure and finally subjecting the cooked material to sub-atmospheric pressure to remove any remaining free sulphur dioxide.

In testimony whereof we affix our signatures.

ROBERT B. WOLF.
RAYMOND P. HILL.
RAYMOND S. HATCH.